(12) United States Patent
Lih et al.

(10) Patent No.: US 9,225,668 B2
(45) Date of Patent: Dec. 29, 2015

(54) PRIORITY DRIVEN CHANNEL ALLOCATION FOR PACKET TRANSFERRING

(71) Applicant: Futurewei Technologies, Inc., Plano, TX (US)

(72) Inventors: Iulin Lih, San Jose, CA (US); Chenghong He, Shenzhen (CN); Hongbo Shi, Xian (CN); Naxin Zhang, Singapore (SG)

(73) Assignee: Futurewei Technologies, Inc., Plano, TX (US)

( * ) Notice: Subject to any disclaimer, the term of this patent is extended or adjusted under 35 U.S.C. 154(b) by 109 days.

(21) Appl. No.: 13/919,193

(22) Filed: Jun. 17, 2013

(65) Prior Publication Data

US 2014/0036930 A1    Feb. 6, 2014

Related U.S. Application Data (60) Provisional application No. 61/677,884, filed on Jul. 31, 2012.

(51) Int. Cl.
| | | |
|---|---|---|
| *H04L 12/28* | (2006.01) | |
| *H04L 12/947* | (2013.01) | |
| *H04L 12/911* | (2013.01) | |
| *H04L 12/861* | (2013.01) | |
| *G06F 15/78* | (2006.01) | |
| *H04L 12/801* | (2013.01) | |
| *H04L 12/863* | (2013.01) | |

(52) U.S. Cl.
CPC .......... *H04L 49/252* (2013.01); *G06F 15/7825* (2013.01); *H04L 47/821* (2013.01); *H04L 49/9047* (2013.01); *H04L 47/39* (2013.01); *H04L 47/6215* (2013.01)

(58) Field of Classification Search
CPC ..................................................... H04L 47/821
See application file for complete search history.

(56) References Cited

U.S. PATENT DOCUMENTS

| | | | |
|---|---|---|---|
| 7,301,898 B1 * | 11/2007 | Martin et al. | ................. 370/229 |
| 8,341,639 B2 | 12/2012 | Lewis | |
| 2001/0043564 A1 | 11/2001 | Bloch et al. | |
| 2002/0129208 A1 * | 9/2002 | Barroso et al. | ................. 711/141 |
| 2003/0117958 A1 * | 6/2003 | Nation et al. | ................. 370/235 |
| 2004/0022188 A1 | 2/2004 | Abel et al. | |

(Continued)

OTHER PUBLICATIONS

"Cisco MDS 9000 Family NX-OS Interfaces Configuration Guide", Cisco MDS NX-OS Release 5.0(1a), Feb. 2010, Text Part: OL-20704-01, 206 pages.

(Continued)

*Primary Examiner* — John Blanton
(74) *Attorney, Agent, or Firm* — Conley Rose, P.C.; Grant Rodolph; William H. Dietrich (57) ABSTRACT

A method comprising advertising to a second node a total allocation of storage space of a buffer, wherein the total allocation is less than the capacity of the buffer, wherein the total allocation is partitioned into a plurality of allocations, wherein each of the plurality of allocations is advertised as being dedicated to a different packet type, and wherein a credit status for each packet type is used to manage the plurality of allocations, receiving a packet of a first packet type from the second node, and storing the packet to the buffer, wherein the space in the buffer occupied by the first packet type exceeds the advertised space for the first packet type due to the packet.

23 Claims, 6 Drawing Sheets

(56) References Cited

U.S. PATENT DOCUMENTS

| | | |
|---|---|---|
| 2004/0081096 A1 | 4/2004 | Martin |
| 2006/0034172 A1 | 2/2006 | Morton |
| 2006/0140121 A1 | 6/2006 | Kakani et al. |
| 2007/0112995 A1* | 5/2007 | Manula et al. ............... 710/310 |
| 2009/0154456 A1 | 6/2009 | Dodson et al. |

OTHER PUBLICATIONS

Lin, A. Y. M., et al., "Priority Queueing Strategies and Buffer Allocation Protocols for Traffic Control at an ATM Integrated Broadband Switching System", IEEE Journal on Selected Areas in Communications, vol. 9, No. 9, Dec. 1, 1991, pp. 1524-1536.

Bolotin, E., et al., "QNoC: QoS Architecture and Design Process for Network on Chip", Journal of Systems Architecture, vol. 50, Feb. 2004, pp. 105-128.

Ozveren, C., et al., "Reliable and Efficient Hop-by-Hop Flow Control", IEEE Journal on Selected Areas in Communications, vol. 13, No. 4, May 1995, pp. 642-650.

Foreign Communication From a Related Counterpart Application, PCT Application PCT/US2013/052727, International Search Report, dated Nov. 21, 2013, 6 pages.

Foreign Communication From a Related Counterpart Application, PCT Application PCT/US2013/052727, Written Opinion, dated Nov. 21, 2013, 11 pages.

Foreign Communication From a Counterpart Application, PCT Application No. PCT/US2013/052897, International Search Report dated Nov. 21, 2013, 5 pages.

Foreign Communication From a Counterpart Application, PCT Application No. PCT/US2013/052897, Written Opinion dated Nov. 21, 2013, 10 pages.

\* cited by examiner

PRIORITY DRIVEN CHANNEL ALLOCATION FOR PACKET TRANSFERRING

CROSS-REFERENCE TO RELATED APPLICATIONS

The present application claims priority to U.S. Provisional Patent Application No. 61/677,884 filed Jul. 31, 2012 by Iulin Lih, et al. and entitled "Priority Driven Channel Allocation for Packet Transferring", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Packet transferring systems may be utilized to share information among multiple nodes, in which a node may be any electronic component that communicates with another electronic component in a networked system. For example, a node may be a memory device or processor in a computing system (e.g., a computer). The computing system may have a plurality of nodes that need to be able to communicate with one another. A node may employ data buffers to store incoming packets temporarily until they can be processed. Packets may be forwarded from one node to another across physical links, which may be divided into virtual channels. These virtual channels may further be allocated into a number of different virtual channel classes with different priority levels for packets. However, buffering may be limited by uneven traffic distribution among different priority packets. For example, buffer space allocated to a specific packet type or priority may be oversubscribed thereby causing congestion for this packet type while buffer space allocated to a different packet type may be underutilized thereby resulting in inefficient use of buffer resources. The overall quality of service (QoS) may be degraded due to high latency during data transmission. Additionally, the throughput and link utilization may be drastically reduced if one or more of the nodes are oversubscribed, and its packet queues back up and consume a large fraction of the available buffers. Thus, there is a need for improving the allocation of buffer space.

SUMMARY

In one embodiment, the disclosure includes a method comprising advertising to a second node a total allocation of storage space of a buffer, wherein the total allocation is less than the capacity of the buffer, wherein the total allocation is partitioned into a plurality of allocations, wherein each of the plurality of allocations is advertised as being dedicated to a different packet type, and wherein a credit status for each packet type is used to manage the plurality of allocations, receiving a packet of a first packet type from the second node, and storing the packet to the buffer, wherein the space in the buffer occupied by the first packet type exceeds the advertised space for the first packet type due to the packet.

In another embodiment, the disclosure includes a method comprising advertising to a second node a total allocation of storage space of a buffer, wherein the total allocation is equal to the capacity of the buffer, wherein the total allocation is partitioned into a plurality of allocations, wherein each of the plurality of allocations is advertised as being dedicated to a different packet type, and wherein a credit status for each packet type is used to manage the plurality of allocations, receiving a packet of a first packet type from the second node, and storing the packet to the buffer, wherein the space in the buffer occupied by the first packet type exceeds the advertised space for the first packet type due to the packet.

In yet another embodiment, the disclosure includes an apparatus comprising a buffer, a transmitter configured to advertise to a second node a total allocation of storage space of the buffer, wherein the total allocation is less than the capacity of the buffer, wherein the total allocation is partitioned into a plurality of allocations, wherein each of the plurality of allocations is advertised as being dedicated to a different packet type, and wherein a credit status for each packet type is used to manage the plurality of allocations, a receiver coupled to the buffer and configured to receive a packet of a first packet type from the second node, and store the packet to the buffer, wherein the space in the buffer occupied by the first packet type exceeds the advertised space for the first packet type due to the packet.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
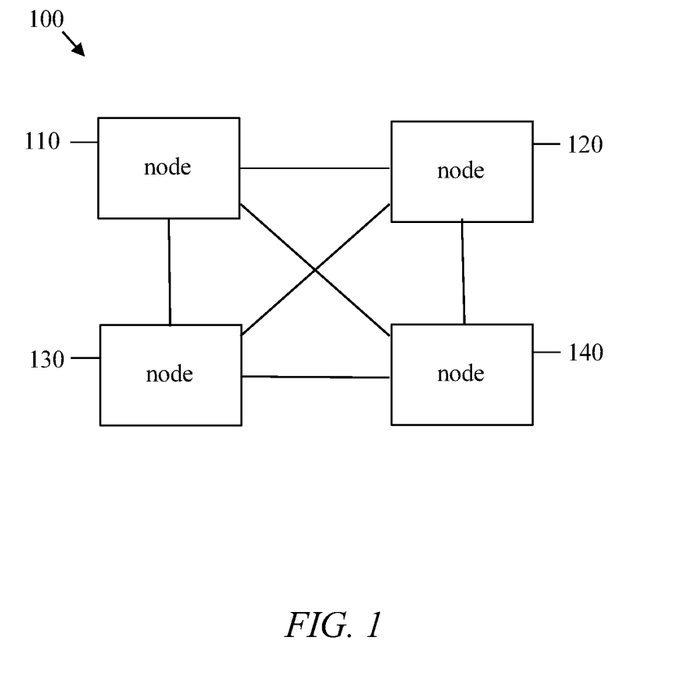
FIG. 1 is an embodiment of an interconnected network system.

FIG. 1 illustrates an embodiment of an interconnected network system 100. The system 100 may comprise a plurality of nodes, such as node 110, node 120, node 130, and node 140. As illustrative examples, a node may be implemented as a distinct electronic component in a system on a chip (SoC), or a node may be a single chip in a plurality of chips such as in a motherboard for a computer system. That is, the nodes may be located in different chips or within components on the same chip for inter-chip or intra-chip communication, respectively. Although only four nodes are shown for illustrative purposes, any number of nodes may be used in the system. The system 100 is shown as a full mesh for purposes of illustration; however, the buffer schemes disclosed herein are not limited to any particular system topology or interconnection. For example, the nodes may be organized as a ring, or any other structure with the nodes arranged in any order.

In system 100, nodes 110-140 are interconnected as a full mesh such that each node may communicate directly with any other node in the system with a single hop. A node may have bidirectional communication capability as it may both transmit and receive packets from other nodes. A transmitting node and a receiving node, which may be referred to hereafter as a transmitter and a receiver, respectively, may each use data buffers to store packets temporarily. For example, node 110 may be a transmitter with a buffer, which holds packets that are to be sent to another node. Node 110 may forward these packets from the buffer to node 120, which may be the receiver. The packets may subsequently be stored in a buffer at node 120 until they are processed.

A packet may be classified according to its packet type. For example, a packet may be classified as a data packet or a control packet. Data packets may contain the data relevant to a node or process such as a payload, while control packets contain information needed for control of a node or process. Data packets may be further classified by latency requirements of a system. A voice call or a video chat may require low latency in order for satisfactory streaming, while a web download may tolerate high latency.

Additionally, different data and control packets may be divided by priority. Control packets that initiate a transaction may be given a lower priority than control packets that finish a transaction. For example, a cache coherence transaction may enable communication between an L1 cache and an L2 cache in order to update and maintain consistency in cache contents. The first step in this transaction may comprise a request to an L2 cache (e.g., from a node other than L1) to perform a write. The L2 cache may send a "snoop" request to the L1 cache to check cache contents and update contents if needed. The L1 cache may then send a "snoop" response to confirm that it is done, and the transaction may be completed with a final response from the L2 cache to confirm the write. In cache coherence transactions, higher priority may be given to a packet that is about to finish a transaction while a packet that is starting the transaction may be assigned a lower priority. Packets for intermediate steps of the transaction may correspond to intermediate priority levels. The various packets of different types and priority levels may be stored in distinct buffer spaces.

A data buffer may be divided into a shared buffer and a plurality of private buffers. A shared buffer may be occupied by different packet types, while a private buffer may be allocated for a specific packet type. Virtual channels may be utilized to forward packets from one buffer at a transmitting node to another buffer at a receiving node. A virtual channel may refer to a physical link between nodes, in which the bandwidth is divided into logical sub-channels. Each channel may be assigned to a private buffer, in which a specific packet type may be stored. The packets may correspond to different packet types (e.g., data or control) as well as different priority levels (e.g., high or low priority).

A shared buffer may be susceptible to head-of-line (HOL) blocking, which involves a stuck packet at the head of a transmission queue. This behavior prevents transmission of subsequent packets until the blocked packet is forwarded. In order to alleviate HOL limitations, packets may be scheduled to fill designated buffers based on priority allocation. Conventional private buffers may only be used by an assigned packet type; however, these buffers may be limited by reduced transmission bursts. Private buffers may also contribute to low buffer availability due to a buffer credit system.

A buffer credit system may be implemented to ensure that a receiver has enough space to accept a packet before transmission. A buffer credit may be sent to a transmitter and set to a value indicating a unit of memory. One buffer credit may be issued per unit of buffer space at a receiver. For example, when a packet is sent to the receiver's buffer, the buffer count (or counter) at the transmitter may be decremented. When a packet is moved out of the receiver's buffer, the buffer count may be incremented. Once the buffer count has been reduced to a minimum value (e.g., zero), the transmitter may know that a particular buffer is full and may wait to send more packets until a ready message is received.

Figure 2:
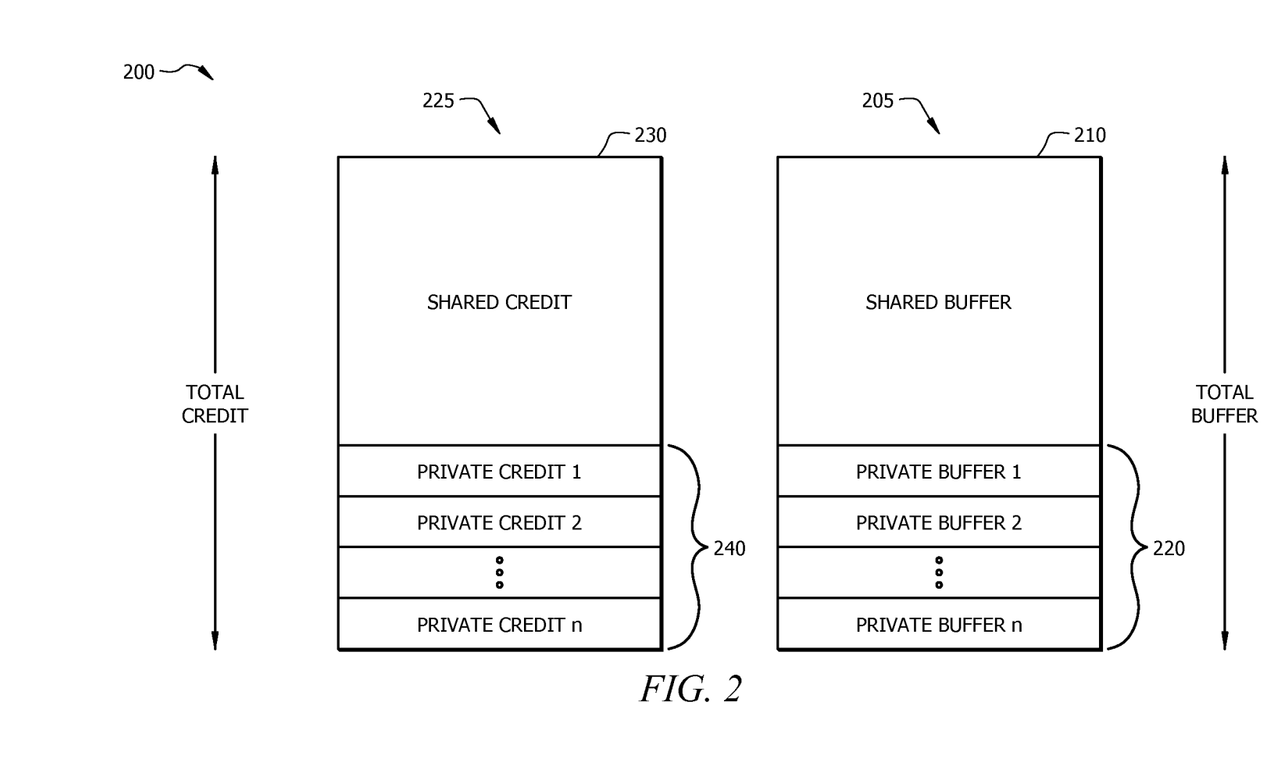
FIG. 2 illustrates an example buffer partition together with the corresponding buffer credits.

FIG. 2 shows an example partition of a buffer 205 together with the corresponding buffer credits 225. The buffer 205 together with the buffer credits 225 may be referred to as a buffer mapping 200. As illustrated in FIG. 2, a buffer 205 may be partitioned into a shared buffer space or region 210 (referred to as a shared buffer) and a plurality of n private buffer spaces or regions 220 (referred to as private buffers), where n≥2. The shared buffer 210 may comprise unallocated space that may be used to store any type of packet whereas the private buffers 220 may each be allocated to store a different packet type of a specific packet type (e.g., priority level). The buffer regions in the buffer 205 may be implemented in a receiving node, such as a node in FIG. 1's interconnected system 100. Data traffic between a transmitter and a receiver may be classified into various packet types, wherein a packet type may be specified according to a priority level of a packet. Suppose n=4 in a system where there are four packet types. For example, a packet of highest priority may be assigned to packet type 1, while a packet of lowest priority may be designated as packet type 4. Packet types 2 and 3 may comprise packets of intermediate priority levels accordingly. Each traffic type may be provided with an allocated portion of a private buffer 220. In a conventional buffer system, packet type 1 may be stored in private buffer 1, packet type 2 may be stored in private buffer 2, and so forth. A shared buffer 210 may be employed by any packet type if its associated private buffer is full. For example, if private buffer 2 has exceeded its memory limit, type 2 packets may then be stored in the shared buffer as long as there is space.

A receiving node may save packet data of a given type to the section of the private buffer 220 allocated for that data type. To determine buffer availability in a buffer 205, there may be associated buffer credits at a transmitting node as shown in FIG. 2, in which there may be one credit assigned per unit of memory (e.g., a specific number of bytes) as required in an implementation. The buffer credit system may comprise shared credits 230 and a plurality of n different private credits 240. The transmitter may maintain a count of private credits 240 for each data type, corresponding to private buffers 240. Similarly, shared credits 230 for a shared buffer 210 may be stored. These buffer credits may be employed to determine the status of a receiver's buffer.

As packets are moved in and out of a shared buffer, the shared credit value may be adjusted accordingly. In an embodiment, a receiver such as node 110 may determine that it is ready to process a packet that is currently stored in one of its private buffers (e.g., private buffer 220). The receiver may then move the packet out and send a message to notify a transmitter of the open space. This message may be a credit for however many units of memory left unoccupied by that packet.

Ultimately, a transmitter may keep track of buffer credits, in terms of decrementing and incrementing the values accordingly. Suppose one of the private buffers 220 occupies 1 kilobyte (KB) of memory with one credit issued per byte (e.g., 1028 credits for 1028 bytes or 1 KB). A transmitter may initially have 1028 credits and may decrement by one as each byte is sent to a receiver. After 1028 bytes of packets have been sent for a specific packet type, a buffer credit count for the corresponding private buffer may be zero. As packets are moved out of an associated receiver's buffer, a transmitter may receive credits back from the receiver and increment the buffer credit count accordingly. The buffer credit system may allow a transmitter to monitor buffer availability to determine whether or not a buffer for a particular node is ready to accept incoming packets.

As will be recognized by a person of ordinary skill in the art, the buffer partitioning shown in FIG. 2 is a convenient logical construct that may not be carried out in practice. That is, the buffer 205 may not in fact be partitioned into regions. Rather, the buffer 205 may be managed as a shared pool of memory by the various packet types. The buffer may be managed according to credits allocated to the various packet types.

A conventional model for packet transfer uses shared and private buffers of fixed sizes, which may work well under the assumption that each packet type is generated in roughly equal numbers. However, this system may be inefficient for handling uneven distributions of traffic. For example, if there is an increased amount of traffic for packet type 2, then other private buffers may sit idle or be underutilized while private buffer 2 becomes overloaded. Thus, there may be a need to enhance buffer allocation and management to better handle uneven distributions of traffic among different packet types.

Disclosed herein are methods and apparatuses that provide enhanced buffer allocation and management. In order to foster efficiency in data buffers, a packet transferring system may be enhanced by allowing a receiver to reserve buffer spaces for designated types of packets. A receiving node may set aside buffer spaces of certain sizes, while advertising buffers of smaller amounts of memory to the transmitter. These reserved spaces may then be used for high priority traffic or to accommodate an influx of a specific packet type in an uneven distribution of traffic. Hence, this approach may allow different packet types to utilize private buffers that may be available for storage, wherein a plurality of corresponding virtual channels may be utilized for transport between buffers. Additionally, a system may adopt a policy that allows packets of one packet type to use private buffer spaces reserved for other packet types to ensure that certain packet types are serviced and not blocked at the expense of servicing other packet types. Thus, buffer and/or channel allocations may improve packet buffer performance by, for example, accommodating uneven traffic distributions.

Figure 3:
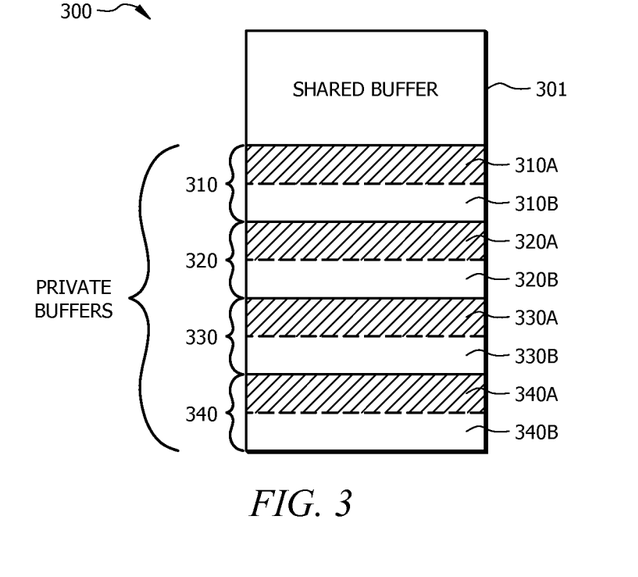
FIG. 3 shows an embodiment of an allocation of a buffer.

FIG. 3 shows an embodiment of an allocation of a buffer 300. The buffer 300 may be implemented in a node such as any node of FIG. 1. Buffer 300 may comprise a shared buffer 301 and a plurality of private buffers 310, 320, 330, and 340. Although only four private buffers are shown for illustrative purposes, any number of private buffers may be used in the system. Private buffer 1 310 may store type 1 packets, and private buffer 2 320 may store type 2 packets. Similarly, private buffer 3 330 may store type 3 packets, and private buffer 4 340 may store type 4 packets. Each of the private buffers 310-340 may be further partitioned into two regions as follows: 310A, 310B, 320A, 320B, 330A, 330B, 340A, and 340B. Buffer regions 310A-340A may be portions of the private buffers that are reserved and advertised to a transmitter. The regions 310A-340A may continue to be referred to as private buffers. Buffer spaces 310B-340B may be unadvertised shared spaces of the private buffers that are transparent to the transmitter. These buffer spaces 310B-340B may be referred to as "private borrowed buffers." The private borrowed buffers 310B-340B may represent memory reserved by a receiver to be used as overflow when any of the shared buffer 301 or private buffers 310A-340A overflow. Although illustrated as disjoint regions, the private borrowed buffers 310B-340B may be disjoint or contiguous regions in the buffer 300.

The private borrowed buffers 310B-340B may be managed collectively as a single private borrowed buffer. Further, the buffer regions illustrated in FIG. 3 may be a convenient logical construct for visualizing the allocation of credits to various packet types. The buffer 300 may not in fact be partitioned into regions, but out of the total allocation of buffer space, a certain amount of space (an allocation) may be set aside for each packet type, with the space allocated to each packet type advertised to another node. The space allocated for the private borrowed buffer may not be advertised to another node. The buffer 300 may be managed according to credits allocated to each packet type.

A receiver may save packet data of a given type to the region of the private buffer allocated for that data type. If the receiver obtains more data of a given type than the amount which may be stored in the allocated space, the receiver may save such data in the shared buffer 301. The ratio of space allocated to the shared buffer 301 to the space allocated to private buffers 310-340 may be preconfigured or modified by the receiver based on system needs or demands. For example, if the receiver observes a trend that traffic becomes more unevenly spread among the different priorities, the receiver may increase the space allocated to the shared buffer 301. Similarly, the ratio of space allocated to the private borrowed buffers 310B-340B to the space allocated to private buffers 310A-340A may be preconfigured or modified by the receiver based on system needs or demands. This scheme may allow the receiver to receive more data in the case that data of various types significantly change in relative volume. Thus, the receiver may have access to buffer memory and divide the regions accordingly.

In one embodiment, the transmitter may be aware of both the private buffers 310A-340A and the shared buffer 301. A receiver may fill the private buffers 310A-340A for data transmissions of each type. When a private buffer (e.g., 310A) becomes full, the receiver may manage the flow of credits to the transmitter such that the transmitter believes the private buffer has space available so that the transmitter continues to transmit packets of a type corresponding to the full private buffer to the receiver. The receiver may then place these packets in the private borrowed buffer. Thus, the transmitter may be unaware of the real status of a private buffer and may behave as if the private buffer has been emptied for further use.

Suppose each of the private buffers 310, 320, 330, and 340 have N bytes worth of memory and there is no shared buffer 301, so that the total buffer space may be 4N bytes. The receiver may then reserve M bytes (M<N) of each private buffer and advertise to a transmitter (which may also be another node in FIG. 1) that each of the private buffers only have M bytes of space for storing incoming packets. The M bytes of advertised buffer spaces may be the private buffers 310A-340A, while the N−M bytes of reserved buffer spaces may be the private borrowed buffers 310B-340B. The receiver may then have a total of 4*(N−M) reserved as backup for overflow packets. In this scenario, suppose the transmitter begins to send a greater number of type 2 packets in comparison to the other types of packets being transmitted. Private buffer 2 320 may begin to store these type 2 packets in the allocated M byte space 320A until the space is filled up. Since there are still open spaces left in the buffer (e.g., 4*(N−M) of reserved resources in 310B-340B), the receiver may send a credit back to the transmitter so that more packets may be sent in order to fill up the other open spaces in the buffer. The receiver may essentially have the intelligence to store the packets in the reserved spaces and manage the credits that are sent back to the transmitter until the buffer resources are full. Furthermore, a receiver may also reserve a small portion of a private buffer that may not be borrowed by any other packet type. This memory may be saved so that the corresponding type of packets may still be stored in its appropriate private buffer in order to keep the buffer system efficient.

Figure 4:
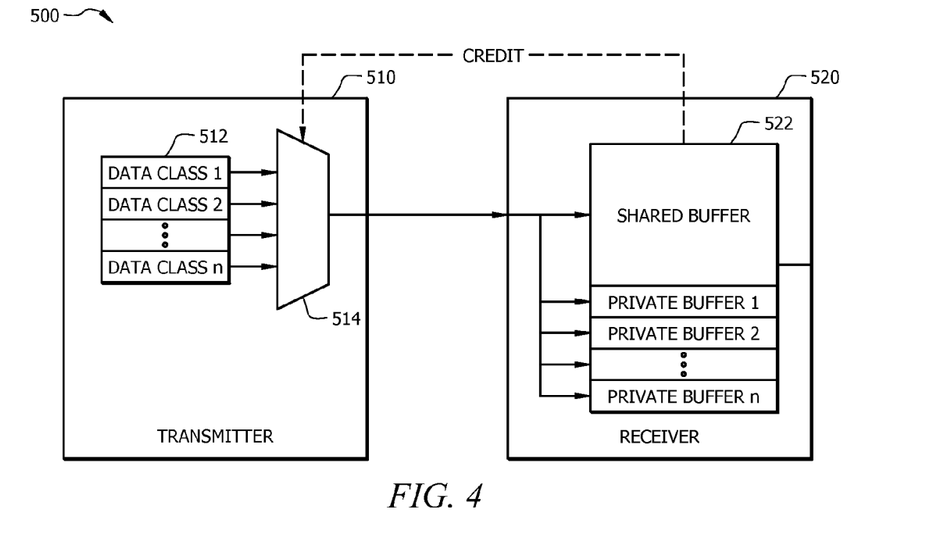
FIG. 4 illustrates data communication between two nodes.

Another feature of an enhanced buffering system focuses on a priority-driven transfer of packets into a plurality of private buffers. FIG. 4 illustrates data communication between two nodes. The scheme 500 may comprise a transmitter 510 and receiver 520. The transmitter 510 may be part of a first node, and the receiver 520 may be part of a second node. The transmitter 510 may comprise a buffer 512 coupled to a multiplexer 514. The multiplexer 514 may select packets from the buffer 512 for transmission. The receiver 520 may comprise a buffer 522.

Communication between the transmitter 510 and the receiver 520 may be conducted using virtual channels. The physical channel between any two nodes (e.g., a node comprising transmitter 510 and a node comprising receiver 520) may be divided into virtual or logical channels, each of which may be used to transmit a specific packet type. Examples of a physical channel between two nodes include a wired connection, such as a wire trace dedicated for communication between the nodes or a shared bus or a wireless connection (e.g., via radio frequency communication). Virtual channels may be designated for packets of various priority levels. A given transfer channel may be assigned to a class so that packet transfer may be managed class by class. For example, virtual channels $a_1, a_2, \ldots, a_n$ may be assigned to packet class a, while virtual channels $b_1, b_2, \ldots, b_n$ may be assigned to packet class b. In another embodiment, multiple packet classes may be assigned to a single channel class.

A packet may be assigned a priority level. A high priority packet may be favored in transfer priority, which may result in early selection for transfer and/or increased channel bandwidth. Channel bandwidth as well as buffer spacing may be redistributed depending on a packet's priority level as well as the frequency of a specific type of packet in data traffic. Priority of a packet may be increased by elevating a priority index. For example, a packet class of priority 1 may use channel classes 1a and 1b, and a packet class of priority 2 may use channel classes 1a, 1b, 2a, and 2b. A packet class of priority n may use channel classes 1a, 1b, 2a, 2b, ..., na, and nb, and so forth.

In an embodiment, packets of a higher priority may utilize transfer channels and/or private buffers that are designated for packets of a lower priority. For example, suppose a packet of priority n, where n is an integer, is transmitted (higher numbers indicate higher priority). If the private buffer for this priority is full, the receiver may store the packet in the private buffer for the next lowest priority (i.e., priority n−1) if the private buffer for priority n−1 has space available. If the private buffer for priority n−1 is full, then the receiver stores the packet in the private buffer for the next lowest priority (i.e., priority n−2) and so on. Thus, a packet of priority n can be stored in any of the private buffers designated for packets of priority 1, 2, ..., n−1, n, but not in a private buffer designated for packets of priority m>n. The transmitter in such a scheme keeps a separate buffer count (or counter) for each private buffer and the shared buffer and selects a packet for transmission of a priority n according to whether there is space available in private buffers for priorities 1, 2, ..., n−1, n as indicated by the buffer counts.

Optionally some amount of a private buffer may be reserved and not borrowed by packets of a higher priority. This would ensure that lower priority packets may have some amount of buffer space to keep the lower priority packets from being blocked by higher priority packets. For example, suppose a packet of priority n is transmitted. If the private buffer for priority n packets is full the receiver may store the packet in the private buffer for the next lowest priority (i.e., priority n−1) if the private buffer for priority n−1 has space available. The receiver may reserve some space on the private buffer for priority n−1 for packets of priority n−1 and not allow packets of priority n to be stored there, in which case the receiver would check the private buffer for the next lowest priority (i.e., priority n−2), and so on.

Sharing resources among high priority packets may facilitate cache coherence transactions for temporary data storage in an interconnected network system. The aforementioned cache coherence transactions may be utilized to confirm that data is up to date among multiple caches. As packets are used in the different steps of such a transaction (e.g., from initiation to completion), the priority levels of the packets may increase accordingly. Thus, packets of high priority may utilize private buffers which are designated for packets of low priority in order to improve efficiency in a system.

Figure 5:
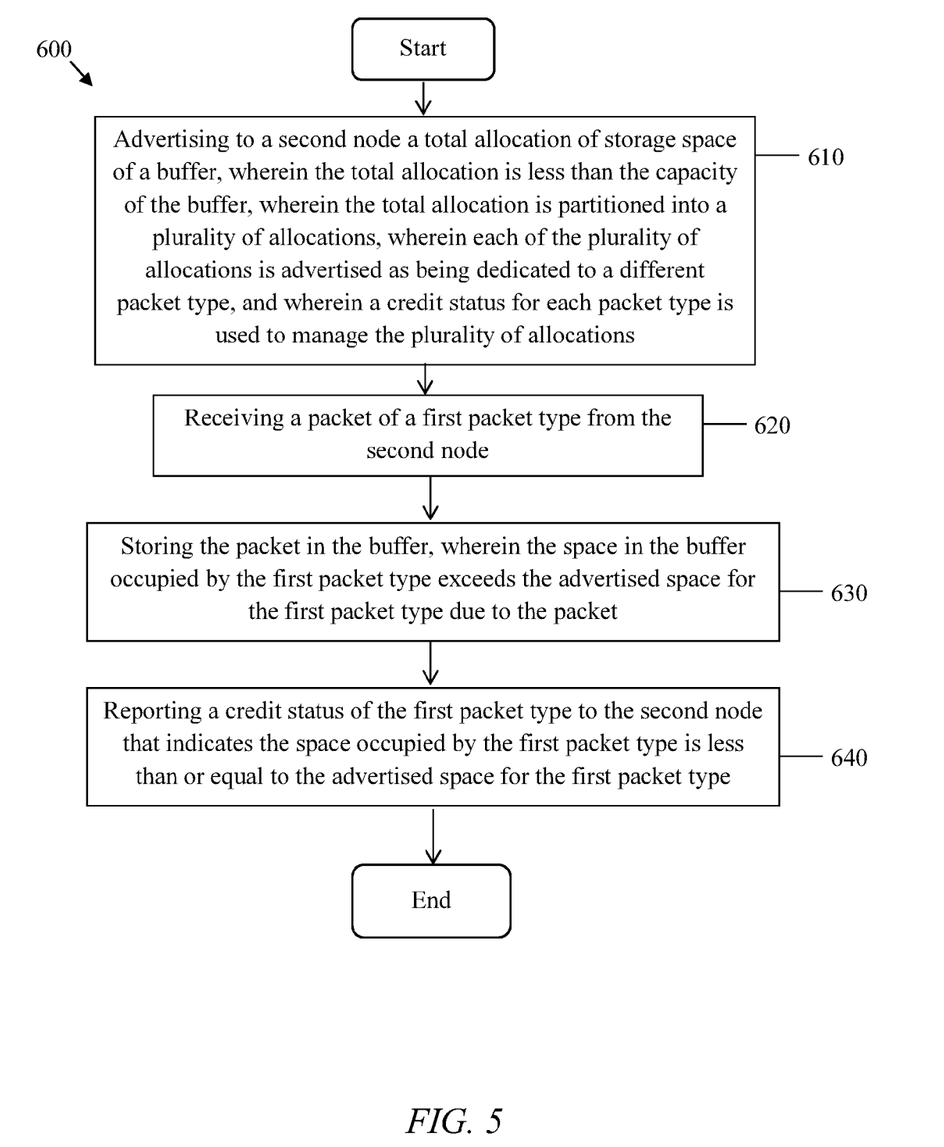
FIG. 5 is a flowchart of an embodiment of a priority driven packet storage method.

FIG. 5 is a flowchart 600 of an embodiment of a buffer space allocation method. The steps of the flowchart 600 may be implemented in a receiving node such as a node in FIG. 1. The flowchart begins is block 610, in which a receiving node may advertise to a second node a total allocation of storage space of a buffer, wherein the total allocation is less than the capacity of the buffer, wherein the total allocation is partitioned into a plurality of allocations, wherein each of the plurality of allocations is advertised as being dedicated to a different packet type, and wherein a credit status for each packet type is used to manage the plurality of allocations. The advertising may comprise the receiver letting the sender know the available credits per packet type (which indicate the allocation per packet type). The packet type may be a priority or any other packet classification discussed herein. Next in block 620, a packet of a first packet type may be received from the second node. Next in block 630, the packet may be stored in the buffer, wherein the space in the buffer occupied by the first packet type exceeds the advertised space for the first packet type due to the packet. That is, the packet may cause the buffer to exceed the advertised space for the first packet type. Finally, in block 640 a credit status of the first packet type may be reported to the second node. The credit status may indicate that the space occupied by the first packet type is less than or equal to the advertised space for the first packet type. The node may therefore use the extra capacity of the buffer that is not advertised to deceive the sender (the second node) into believing that the first packet type has not overflowed the advertised space allocated to it. Further, an embodiment may optionally include partitioning the buffer into a plurality of regions comprising a plurality of private buffers and a private borrowed buffer, wherein the private borrowed buffer is transparent to a second node coupled to the node, and wherein each of the private buffers is for storing a different packet type, wherein the plurality of allocations corresponds to the plurality of regions, and wherein storing the packet in the buffer comprises storing the packet in the private borrowed buffer. The private borrowed buffer represents space that is not advertised to the second node. The private borrowed buffer may be the difference between the capacity of the buffer and the total allocation of storage space.

The flowchart may be changed slightly by making the total allocation equal to the capacity of the buffer in block 610. In this scenario, there would not be any space of a buffer that is not advertised (i.e., all of the available buffer space is advertised). In this scenario, an embodiment may optionally include partitioning the buffer into a plurality of regions comprising a first private buffer and a second private buffer, wherein the first private buffer is for storing packets of the first packet type, wherein the second private buffer is for storing packets of the first packet type or a second packet type, wherein the plurality of regions corresponds to the plurality of allocations, and wherein storing the packet in the buffer comprises storing the packet in the first private buffer. This type of activity is described further with respect to FIG. 4.

Figure 6:
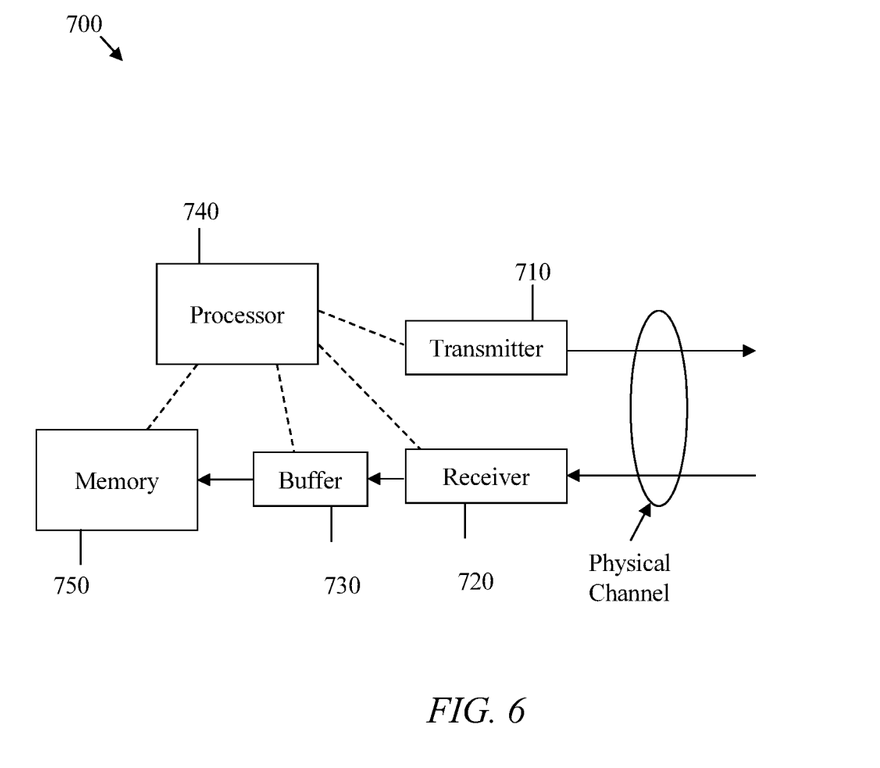
FIG. 6 is a schematic diagram of a packet transferring system.

At least some of the features/methods described in the disclosure may be implemented in a network apparatus or electrical component with sufficient processing power, memory/buffer resources, and network throughput to handle the necessary workload placed upon it. For instance, the features/methods of the disclosure may be implemented using hardware, firmware, and/or software installed to run on hardware. FIG. 6 illustrates a schematic diagram of a node 700 suitable for implementing one or more embodiments of the components disclosed herein. The node 700 may comprise a transmitter 710, a receiver 720, a buffer 730, a processor 740, and a memory 750 configured as shown in FIG. 6. Although illustrated as a single processor, the processor 740 may be implemented as one or more central processing unit (CPU) chips, cores (e.g., a multi-core processor), field-programmable gate arrays (FPGAs), application specific integrated circuits (ASICs), and/or digital signal processors (DSPs). The transmitter 710 and receiver 720 may be used to transmit and receive packets, respectively, while the buffer 730 may be employed to store packets temporarily. The buffer 730 may comprise a plurality of private buffers, such as the buffer shown in FIGS. 3 and 5. The buffer 730 may optionally comprise a shared buffer and/or a private borrowed buffer as shown in FIG. 3. Packets may be forwarded from the node 700 across a physical channel, which may be divided into a plurality of virtual channels as described previously.

The memory 750 may comprise any of secondary storage, read only memory (ROM), and random access memory (RAM). The RAM may be any type of RAM (e.g., static RAM) and may comprise one or more cache memories. Secondary storage is typically comprised of one or more disk drives or tape drives and is used for non-volatile storage of data and as an over-flow data storage device if the RAM is not large enough to hold all working data. Secondary storage may be used to store programs that are loaded into the RAM when such programs are selected for execution. The ROM may be used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The node 700 may implement the methods and algorithms described herein, including the flowchart 600. For example, the processor 740 may control the partitioning of buffer 730 and may keep track of buffer credits. The processor 740 may instruct the transmitter 710 to send packets and may read packets received by receiver 720. Although shown as part of the node 700, the processor 740 may not be part of the node 700. For example, the processor 740 may be communicatively coupled to the node 700.

It is understood that by programming and/or loading executable instructions onto the node 700 in FIG. 6, at least one of the processor 740 and the memory 750 are changed, transforming the system 700 in part into a particular machine or apparatus having the functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a node, comprising:
    advertising to a second node a total allocation of storage space of a buffer, wherein the total allocation is less than a capacity of the buffer, wherein the total allocation is partitioned into a plurality of allocations, wherein each of the plurality of allocations is advertised as being dedicated to a different packet type, and wherein a credit status for each packet type is used to manage the plurality of allocations;
    receiving a packet of a first packet type from the second node; and
    storing the packet in the buffer, wherein a space in the buffer occupied by the first packet type exceeds the advertised space for the first packet type due to the packet and is permanently allocated for storage of only the first packet type prior to storage of the packet in the buffer.

2. The method of claim 1, further comprising reporting a credit status of the first packet type to the second node that indicates the space occupied by the first packet type is less than or equal to the advertised space for the first packet type after receiving the packet.

3. The method of claim 2, further comprising determining that there will be space remaining in the buffer after storing the packet, wherein the reporting the credit status of the first packet type is in response to the determining.

4. The method of claim 2, wherein the space occupied in the buffer by packets of various packet types is greater than the advertised total allocation.

5. The method of claim 2, further comprising partitioning the buffer into a plurality of regions comprising a plurality of private buffers and a private borrowed buffer, wherein the private borrowed buffer is transparent to the second node coupled to the node, and wherein each of the private buffers is for storing a different packet type, wherein the plurality of allocations corresponds to the plurality of regions, and wherein storing the packet in the buffer comprises storing the packet in the private borrowed buffer.

6. The method of claim 5, wherein the first packet type is a first priority, wherein a second packet type is a second priority, and wherein the first priority is higher than the second priority, and wherein the method further comprises:
    receiving a second packet of the second priority from the second node prior to receiving the packet, and wherein the packet and the second packet are part of a cache coherence transaction; and
    writing the second packet to the second private buffer.

7. The method of claim 6, wherein the packet has a higher priority than the second packet because the packet is received after the second packet in the cache coherence transaction.

8. The method of claim 7, wherein the plurality of private buffers are coupled to a physical channel between the node and the second node, wherein the physical channel is divided into a plurality of virtual channels, and wherein each channel is assigned to at least one corresponding packet priority.

9. The method of claim 5, wherein the plurality of regions further comprises a shared buffer, wherein the shared buffer is configured to store a plurality of packets of various priorities.

10. The method of claim 9, further comprising managing a flow of credits to the second node, wherein the credits are for the shared buffer and the private buffers, and wherein some credits for the private buffers correspond to packets stored in the private borrowed buffer.

11. A method comprising:
    advertising to a second node a total allocation of storage space of a buffer, wherein the total allocation is equal to a capacity of the buffer, wherein the total allocation is partitioned into a plurality of allocations, wherein each of the plurality of allocations is advertised as being dedicated to a different packet type, and wherein a credit status for each packet type is used to manage the plurality of allocations;
    receiving a packet of a first packet type from the second node; and
    storing the packet in the buffer, wherein a space in the buffer occupied by the first packet type exceeds the advertised space for the first packet type due to the packet and is permanently allocated for storage of only the first packet type prior to storage of the packet in the buffer.

12. The method of claim 11, further comprising reporting a credit status of the first packet type to the second node that indicates the space occupied by the first packet type is less than or equal to the advertised space for the first packet type after receiving the packet.

13. The method of claim 12, further comprising determining that there will be space remaining in the buffer after storing the packet, wherein the reporting the credit status of the first packet type is in response to the determining.

14. The method of claim 12 further comprising partitioning the buffer into a plurality of regions comprising a first private buffer and a second private buffer, wherein the first private buffer is for storing packets of the first packet type, wherein the second private buffer is for storing packets of the first packet type or a second packet type, wherein the plurality of regions corresponds to the plurality of allocations, and wherein storing the packet in the buffer comprises storing the packet in the first private buffer.

15. The method of claim 14, wherein the first packet type is a first priority, wherein the second packet type is a second priority, and wherein the first priority is higher than the second priority, wherein the method further comprises:

receiving a second packet of the second priority from the second node prior to receiving the packet, and wherein the packet and the second packet are part of a cache coherence transaction; and writing the second packet to the second private buffer.

16. The method of claim 14, wherein a portion of the second private buffer is reserved for storing packets of the second priority, and wherein a remainder of the second private buffer is for storing packets of the first priority and the second priority.

17. The method of claim 16, wherein the plurality of regions further comprises a third private buffer, wherein the third private buffer is for storing packets of the first priority, the second priority, or a third priority, and wherein the method further comprises:

receiving a second packet of the first priority from the second node;

determining again that the first private buffer is full;

determining that the remainder of the second private buffer is full, wherein the portion of the second private buffer is not full; and in response to determining that the remainder of the second private buffer is full, writing the second packet to the third private buffer.

18. The method of claim 14, wherein the plurality of regions further comprises a shared buffer, and wherein the method further comprises:

receiving a second packet of the second priority from the second node;

determining that the second private buffer is full; and in response to determining that the second private buffer is full, writing the packet to the shared buffer.

19. An apparatus comprising:

a buffer;

a transmitter configured to advertise to a second node a total allocation of storage space of the buffer, wherein the total allocation is less than a capacity of the buffer, wherein the total allocation is partitioned into a plurality of allocations, wherein each of the plurality of allocations is advertised as being dedicated to a different packet type, and wherein a credit status for each packet type is used to manage the plurality of allocations;

a receiver coupled to the buffer and configured to:

receive a packet of a first packet type from the second node; and store the packet to the buffer, wherein a space in the buffer occupied by the first packet type exceeds an advertised space for the first packet type due to the packet and is permanently allocated for storage of only the first packet type prior to storage of the packet in the buffer.

20. The apparatus of claim 19, further comprising a processor coupled to the buffer and configured to partition the buffer into a plurality of regions comprising a plurality of private buffers and a private borrowed buffer, wherein each of the private buffers is for storing a different packet type, wherein the plurality of allocations corresponds to the plurality of regions, and wherein storing the packet to the buffer comprises storing the packet in the private borrowed buffer.

21. The apparatus of claim 20, wherein the processor is further configured to:

determine that a private buffer from among the plurality of private buffers for the packet is full; and instruct the receiver to write the packet to the private borrowed buffer in response to the determining.

22. The apparatus of claim 21, wherein the apparatus further comprises a transmitter coupled to the processor, and wherein the processor is further configured to instruct the transmitter to send a credit for the private buffer to the node in response to the determining.

23. The apparatus of claim 22, wherein the first packet type is a first priority, wherein a second packet type is a second priority, and wherein the first priority is higher than the second priority, wherein the receiver is further configured to receive a second packet of the second priority from the node prior to receiving the packet, wherein the packet and the second packet are part of a cache coherence transaction, and wherein the processor is further configured to instruct the receiver to write the second packet to a second private buffer from among the plurality of private buffers.

* * * * *